US012055428B2

(12) United States Patent
Kirst

(10) Patent No.: US 12,055,428 B2
(45) Date of Patent: Aug. 6, 2024

(54) MEASURING-DEVICE SYSTEM AND MEASURING ASSEMBLY FORMED THEREWITH

(71) Applicant: Endress+Hauser Flowtec AG, Reinach (CH)

(72) Inventor: Michael Kirst, Lörrach (DE)

(73) Assignee: Endress+Hauser Flowtec AG, Reinach (CH)

( * ) Notice: Subject to any disclaimer, the term of this patent is extended or adjusted under 35 U.S.C. 154(b) by 122 days.

(21) Appl. No.: 17/274,504

(22) PCT Filed: Aug. 13, 2019

(86) PCT No.: PCT/EP2019/071707
§ 371 (c)(1),
(2) Date: Mar. 9, 2021

(87) PCT Pub. No.: WO2020/052892
PCT Pub. Date: Mar. 19, 2020

(65) Prior Publication Data
US 2021/0270661 A1    Sep. 2, 2021

(30) Foreign Application Priority Data

Sep. 10, 2018 (DE) ............ 10 2018 122 014.6

(51) Int. Cl.
*G01F 23/28*    (2006.01)
*G01F 1/696*    (2006.01)
(Continued)

(52) U.S. Cl.
CPC ............ *G01F 23/282* (2013.01); *G01F 1/696* (2013.01); *G01F 15/068* (2013.01); *G01F 23/24* (2013.01)

(58) Field of Classification Search
CPC ...... G01F 1/696; G01F 15/063; G01F 15/068; G01F 23/24; G01F 23/282
See application file for complete search history.

(56) References Cited

U.S. PATENT DOCUMENTS

| 5,960,375 A | 9/1999 | Warrior et al. |
| 7,484,416 B1 * | 2/2009 | Klosinski ........... G05B 23/0235 714/25 |

(Continued)

FOREIGN PATENT DOCUMENTS

| CN | 1516808 A | 7/2004 |
| CN | 101711351 A | 5/2010 |

(Continued)

*Primary Examiner* — Justin N Olamit
(74) *Attorney, Agent, or Firm* — Mark A. Logan; Endress+Hauser (USA) Holding, Inc.

(57) ABSTRACT

The measuring-device system comprises two measuring devices and an evaluating- and supply electronics. Each of the measuring devices has a measured variable transducer and a measurement transmitter. Each of the transducers is adapted to react to a measured variable and to provide a corresponding transducer signal. The first measurement transmitter includes an interface circuit both for wired energy supply and for wired signal transmission on a two-wire loop. The second measurement transmitter includes an interface circuit for wired energy supply and a radio unit. The evaluating- and supply electronics feeds electrical power into the two-wire loop during operation. Both measurement transmitters are adapted to draw electrical power from the electrical current loop. Additionally, the first measurement transmitter is adapted to transmit its measurement signal via the electrical current loop to the evaluating- and supply electronics.

32 Claims, 7 Drawing Sheets

(51) Int. Cl.
  *G01F 15/06* (2022.01)
  *G01F 23/24* (2006.01)

(56) References Cited

U.S. PATENT DOCUMENTS

| | | | | |
|---|---|---|---|---|
| 7,663,350 | B2 * | 2/2010 | Kirst | H02H 9/008 |
| | | | | 323/268 |
| 7,835,125 | B2 * | 11/2010 | Freiburger | G05B 19/0425 |
| | | | | 361/93.1 |
| 8,217,782 | B2 * | 7/2012 | Nelson | G05B 19/042 |
| | | | | 340/10.33 |
| 8,380,463 | B2 * | 2/2013 | Philipps | G01D 21/02 |
| | | | | 702/57 |
| 9,372,107 | B2 * | 6/2016 | Kirst | G01F 1/8436 |
| 9,660,325 | B2 * | 5/2017 | Haase | H01Q 1/22 |
| 10,505,585 | B2 * | 12/2019 | Benson | H04L 12/40 |
| 2009/0295367 | A1 | 12/2009 | Fauveau | |
| 2010/0082122 | A1 | 4/2010 | Davis et al. | |
| 2011/0317390 | A1 * | 12/2011 | Moser | G01D 11/245 |
| | | | | 361/679.01 |
| 2017/0356780 | A1 | 12/2017 | Smith et al. | |

FOREIGN PATENT DOCUMENTS

| | | | | |
|---|---|---|---|---|
| CN | 101730834 | A | 6/2010 | |
| CN | 101796386 | A | 8/2010 | |
| CN | 102171620 | A | 8/2011 | |
| CN | 102203566 | A | 9/2011 | |
| DE | 102006062603 | A1 * | 7/2008 | G05B 19/0428 |
| DE | 102007021099 | A1 | 11/2008 | |
| DE | 102015115273 | A1 | 3/2017 | |
| DE | 102017116746 | A1 | 1/2018 | |
| EP | 1808837 | A2 * | 7/2007 | G08C 19/02 |
| WO | WO-2017084828 | A1 * | 5/2017 | G01D 18/006 |
| WO | 2018050422 | A1 | 3/2018 | |

\* cited by examiner

MEASURING-DEVICE SYSTEM AND MEASURING ASSEMBLY FORMED THEREWITH

CROSS-REFERENCE TO RELATED APPLICATIONS

The present application is related to and claims the priority benefit of German Patent Application No. 10 2018 122 014.6, filed on Sep. 10, 2018 and International Patent Application No. PCT/EP2019/071707 filed on Aug. 13, 2019, the entire contents of which are incorporated herein by reference.

TECHNICAL FIELD

The invention relates to a measuring-device system having two measuring devices as well as an evaluating- and supply electronics. The invention relates also to a measuring assembly formed by means of such a measuring-device system.

BACKGROUND

Various measuring devices, referred to at times, also as "field devices", or "field instruments", are used In industrial measuring- and automation technology for ascertaining measured values for physical or chemical measured variables of flowable measured substances, for example, a gas, a liquid or a dispersion, conveyed in a flow system, for example, a flow system formed by means of one or more tanks and/or one or more pipelines. Frequently measured variables of interest can be, for example, substance parameters characterizing the particular medium, thus, substance parameters such as, for instance, a pH-value, an oxygen-content, an electrical conductivity, a density or a viscosity, and even process parameters associated with the respective medium, such as, for instance, a temperature, a pressure, a volume flow, a mass flow or a fill level, and even predetermined limit-, or threshold values. Accordingly, frequently applied field-measuring devices include, among others, fill level measuring devices, pressure-measuring devices, flow-measuring devices, temperature-measuring devices, pH-measuring devices, oxygen-measuring devices and conductivity-measuring devices and even corresponding switching devices, especially limit switches. Examples of such measuring devices and their application in process control systems involving above-mentioned flow systems are disclosed in, among others, US-A 2001/0016802, US-A 2004/0172205, US-A 2006/0161359, US-A 2008/0268784, US-A 2009/0253388, which US-A 2010/0201342, US-A 2011/0134817, US-A 2013/0009472, US-A 2013/0278222, US-A 2013/0333465, US-A 2014/0070609, US-A 2015/0039924, US-A 2016/0099754, US-A 2016/0043730, WO-A 96/12993, WO-A 2005/017851, WO-A 2005/116787, WO-A 2006/025918, WO-A 2009/003146, WO-A 2009/003148, WO-A 2009/114064, WO-A 2009/154744, WO-A 2011/119892, WO-A 2012/084280, WO-A 2017/041987, WO-A 2017/041988, WO-A 2017/041989, WO-A 2018/050422 and even PCT/EP2018/066250, which was not published before the earliest filing date to which this application is entitled. Often, in such case, also such measuring assemblies are established, in the case of which the two or more measuring devices are combined to a measuring-device system, namely arranged in the immediate vicinity of one another on the same pipeline, or, as shown schematically in FIG. 1, 2 or 3, on the same tank, and with which measured variables different from one another or, however, also the same measured variable can be measured, for example, diversely, redundantly or completingly as regards the measuring range.

A measuring device of the type being discussed includes a measured variable transducer, typically a single, measured variable transducer, an electronic measurement transmitter electrically connected therewith, for example, an electronic measurement transmitter formed by means of one or more microprocessors, or a programmable, electronic measurement transmitter, as well as a typically pressure resistant, in given cases, also explosion safe, transmitter housing, within which the measurement transmitter is protectively accommodated and which meets the requirements of ignition protection type, "pressure resistant encapsulation (Ex d-)", according to EN 60079-1:2007, and protecting against penetration of dust or water spray, in given cases, also at least meeting the requirements of protection type IP 54 according to DIN EN 60529:2014-09. Measurement transmitters of field devices are also regularly so embodied that they can satisfy the ignition protection type, "device protection by intrinsic safety (Exi-)", according to EN 60079 11:2012 and/or the ignition protection type, "increased safety (Ex e-)", according to EN 60079-7:2007. The measured variable transducer, sometimes also referred to as sensor, detector, primary transducer or, for example, also measuring-sensor, is adapted to react to the measured value to be registered as well as to provide a—typically electrical—transducer signal, in such a manner that the transducer signal follows a change of the measured variable with a change of at least one signal parameter, for example, an electrical voltage or an electrical current. The measurement transmitter is, in turn, adapted to receive the transducer signal and based on it to ascertain measured values sequentially quantifying the at least one measured variable. The field devices discussed in US-A 2001/0016802, US-A 2006/0161359, WO-A 2005/017851, WO-A 2009/114064 and WO-A 2012/084280 are for purposes of industrial measuring- and automation technology typically embodied as two-conductor-measuring devices, namely field devices, in the case of which the measurement transmitter has, in each case, an interface circuit, for example, embodied as a switching output and/or TTY interface, for wired energy supply of the measuring device as well as for wired signal transmission. The particular measurement transmitter is, additionally, electrically connected via corresponding electrical lines also with an evaluating- and supply electronics typically arranged spatially remotely from the measuring device and embodied, for example, also as a component of a superordinated electronic data processing system, or a process control system including the measuring device, in such a manner that the interface circuit of the measurement transmitter is electrically connected to the evaluating- and supply electronics to form an electrical current loop involving both the interface circuit as well as also the evaluating- and supply electronics, and the measurement transmitter is, additionally, in each case, also adapted to convert the measured values won based on the transducer signal into a measurement signal representing the measured variable, namely an electrical measurement signal, for example, an analog or even binary, output signal of the interface circuit.

An evaluating- and supply electronics of the above described type is, in turn, adapted to supply electrical power, for example, with an electrical voltage of greater than 12 V (volt) and/or less than 45 V and an electrical current of greater than 3.6 mA and/or less than 23 mA, into the above-mentioned electrical current loop, and the measurement transmitter is adapted both to draw electrical power from the electrical current loop as well as also to transmit the output signal to the evaluating- and supply electronics, for example, based on load modulation of a loop current, namely by modulation of an electrical current driven in the electrical current loop by the evaluating- and supply electronics. Especially, the measurement transmitters are adapted to output the output signal serving as measurement signal as a signal standardized to conform, for example, to the standard, DIN IEC 60381-1:1985-11, especially as an electrical current signal, and/or to transmit the output signal to the evaluating- and supply electronics by load modulation of the above described loop current, for example, in such a manner that the loop current is set, or modulated, by means of the interface circuit as a function of the measured variable to an electrical current level lying within a range 4-20 mA and/or to a form satisfying one or more of the standards, DIN IEC 60381-1:1985-11, IEC 61784-1 CPF1 (Foundation Fieldbus), IEC 61784-1 CPF3:2016 (Profibus), IEC 61158 or IEC 61784-1 CPF9 (HART), in each case, in version governing on 10.09.2018. For the case that the output signal is a binary signal assuming only two discrete values, the measured variable is typically coded with an electrical current level of the loop current set to 4 mA or to 20 mA.

Besides the above referenced field devices transmitting measured values only by wire and, in given cases, formed also as two-conductor-measuring devices, used in always greater numbers are, however, also such field devices of industrial measuring- and automation technology, in the case of which the measurement transmitter, alternatively or in supplementation to the above discussed wired signal transmission, has a radio unit and in the case of which the measurement transmitter, such as shown in, among others, US-A 2004/0172205, US-A 2008/0268784, US-A 2009/0253388, which US-A 2012/0306276, US-A 2013/0009472, US-A 2013/0333465, WO-A 2005/116787, WO-A 2006/025918, WO-A 2009/003146, WO-A 2009/003148, WO-A 2017/041987, WO-A 2017/041988, WO-A 2017/041989 or WO-A 2018/050422, is adapted to convert the transducer signal into a radio signal, namely electromagnetic, free-space waves transmitted via a radio unit, in order wirelessly to transfer a sequence of at least some of the above described measured values. The measurement transmitter, or the measuring device formed therewith, can, in such case, such as indicated in, among others, US-A 2013/0009472, or as shown in FIG. 2, be embodied as an autarkic measuring device, namely a device supplied internally with electrical energy required for operation by means of a storage circuit formed with one or more electrochemical energy storers, which are, in given cases, rechargeable, and/or, such as disclosed in, among others, US-A 2013/0333465 or WO-A 2017/041987, or also as shown in FIG. 3, be embodied as a hybrid measuring device, namely a device supplied from the exterior by wire with electrical energy required for operation via an interface circuit incorporated in an electrical current loop of the aforementioned type. The radio unit is typically adapted to transmit and/or to receive radio signals conforming to one of the standards, IEEE 802.15.4 (WPAN, wireless HART, ZigBee), IEEE 802.11 (WLAN, WiFi) or IEEE 802.15.1 (Bluetooth). The radio unit can together with other components of the measurement transmitter be accommodated within the above described transmitter housing or, such as shown in, among others, also WO-A 2005/116787 or WO-A 2009/154744 or in FIG. 3, for example, also be accommodated in its own protective housing of an independent radio module, sometimes also referred to as a wireless adapter, applied externally on the transmitter housing.

A disadvantage of field devices transferring measured values by means of such a radio unit is, among others, that, on the one hand, in order to transfer the measured values with acceptable transmission rate and range, a relatively high electrical power is required and that, on the other hand, the electrical power available in the measuring device steadily, or at least for a predetermined operating time, is typically very limited, namely regularly significantly less than 100 mW (milliwatt), for instance, due to limited storage capacity of the above described energy storer and/or due to specifications as regards the ignition protection type to be met by the measurement transmitter and/or due to a loop current regularly set at comparatively low electrical current level, in such a manner that the transmission rate and/or the transmission range can, at times, lie significantly below actually needed minimum values.

Starting from aforementioned state of the art, an object of the invention, is so to improve measuring assemblies formed by means of measuring devices of the above described type that, on the one hand, one or more measured variables in a flow system can be registered very precisely within a predeterminable measuring range with a high updating rate and that, on the other hand, measured values ascertained for one or more of the measured variables can be transmitted with a high transmission rate and/or high transmission range wirelessly to the evaluating- and supply electronics, or to a superordinated electronic data processing system remote from the measuring assembly.

SUMMARY

For achieving the object, the invention resides in a measuring-device system, comprising:
a first measuring device, for example, one embodied as a two-conductor-field device, with a first measured variable transducer, which is adapted to react to a first measured variable and to provide a first transducer signal, for example, an electrical, first transducer signal, in such a manner that the first transducer signal follows a change of the first measured variable with a change of at least one signal parameter, and, electrically connected with the first measured variable transducer, and, for example, formed by means of at least one microprocessor, a first measurement transmitter, which has, for example, embodied as a switch output and/or TTY interface, an interface circuit serving both for wired signal transmission as well as also for wired energy supply and which is adapted to receive the first transducer signal and to convert such into a measurement signal, namely an electrical output signal of the interface circuit representing the first measured variable and, for example, embodied as a binary coded, switching signal;
a second measuring device having a second measured variable transducer, which is adapted to react to a second measured variable and to provide a second transducer signal, for example, an electrical, second transducer signal, in such a manner that the second transducer signal follows a change of the second measured variable with a change at least one signal parameter, and having, electrically connected with the second measured variable transducer, and formed, for example, by means of at least one microprocessor, a second measurement transmitter, which has an interface circuit serving for wired energy supply and a radio unit and which is adapted to receive the second transducer signal and to convert such into a radio signal, namely electromagnetic, free-space waves transmitted via the radio unit and wirelessly transmitting a sequence of measured values quantifying the second measured variable; as well as an evaluating- and supply electronics.

In the measuring-device system of the invention, the interface circuit of the first measurement transmitter is electrically connected to the evaluating- and supply electronics to form an electrical current loop (2L) involving both the interface circuit as well as also the evaluating- and supply electronics and the interface circuit of the second measurement transmitter is electrically connected to the first measurement transmitter, for example, its interface circuit and/or the electrical current loop formed therewith. The evaluating- and supply electronics is, additionally, adapted to supply electrical power P1 into the electrical current loop, for example, with an electrical voltage of greater than 12 V (volt) and/or less than 45 V. Moreover, the first measurement transmitter, for example, its interface circuit, is adapted both to draw electrical power from the electrical current loop as well as also to transmit the measurement signal to the evaluating- and supply electronics, for example, by modulation of an electrical current in the electrical current loop driven by the evaluating- and supply electronics and the second measurement transmitter, for example, its interface circuit, is adapted to draw electrical power from the electrical current loop, and, for example, also to control the second measurement transmitter and/or the radio unit as a function of an instantaneous electrical current level of an electrical current in the electrical current loop. The first measuring device can be embodied, for example, also as a fill level limit switch, as a flow switch and even as a pressure switch. The second measuring device can be embodied, for example, also as a fill level measuring device or as a flow measuring device.

Furthermore, the invention resides also in a measuring assembly formed by means of such a measuring-device system, which comprises besides the measuring-device system a flow system, for example, one formed by means of a tank and/or a pipeline, and which is adapted to convey a flowable medium, wherein both the first measuring transducer as well as also the second measuring transducer of the measuring-device system are applied in the flow system, for example, spaced from one another by more than 1 m (meter).

In a first embodiment of the measuring-device system of the invention, it is, furthermore, provided that the evaluating- and supply electronics is adapted to process, for example, to receive and to evaluate, the measurement signal of the first measuring device. Developing this embodiment of the invention, it is, furthermore, provided that the evaluating- and supply electronics is adapted to digitize the measurement signal of the first measuring device and/or to ascertain measured values, for example, digital measured values, representing the first measured variable using the measurement signal of the first measuring device.

In a second embodiment of the measuring-device system of the invention, it is, furthermore, provided that the electrical current loop has at least one, first two-conductor line formed of two individual conductors, for example, individual conductors twisted about one another, and both a first individual conductor of the first two-conductor line as well as also a second individual conductor of the first two-conductor line are electrically connected to the evaluating- and supply electronics, for example, in such a manner that the first individual conductor of the first two-conductor line forms an outgoing line of the electrical current loop and/or that the second individual conductor of the first two-conductor line forms a return line of the electrical current loop. Developing this embodiment of the invention, it is, furthermore, provided that at least the first individual conductor of the first two-conductor line is electrically connected to the second measurement transmitter, for example, to a first connection terminal of the second measurement transmitter electrically connected with the interface circuit of the second measurement transmitter. Moreover, additionally, the second individual conductor of the first two-conductor line, for example, led to the second measurement transmitter, can, equally as well, not be electrically connected with its interface circuit, for example, electrically connected to a second connection terminal of the second measurement transmitter not electrically connected with the interface circuit of the second measurement transmitter.

In a third embodiment of the measuring-device system of the invention, it is, furthermore, provided that the radio unit of the second measurement transmitter is adapted to transmit the radio signal with a first radiative power, for example, an adaptable first radiative power and/or a first radiative power amounting to less than 100 mW (milliwatt).

In a fourth embodiment of the measuring-device system of the invention, it is, furthermore, provided that the electrical current loop has at least one, first two-conductor line formed of two individual conductors, for example, individual conductors twisted about one another, and the electrical current loop has at least one, second two-conductor line formed of two individual conductors, for example, individual conductors twisted about one another, wherein both a first individual conductor of the first two-conductor line as well as also a second individual conductor of the first two-conductor line are electrically connected to the evaluating- and supply electronics, for example, in such a manner that the first individual conductor of the first two-conductor line forms an outgoing line of the electrical current loop and/or that the second individual conductor of the first two-conductor line forms a return line of the electrical current loop. Developing this embodiment of the invention, it is, furthermore, provided that both a first individual conductor of the second two-conductor line as well as also a second individual conductor of the second two-conductor line are electrically connected to the first measurement transmitter, for example, in such a manner that the first individual conductor of the second two-conductor line is electrically connected to a first connection terminal of the first measurement transmitter electrically connected with the interface circuit of the first measurement transmitter and the second individual conductor of the second two-conductor line is electrically connected to a second connection terminal of the first measurement transmitter electrically connected with the interface circuit of the first measurement transmitter. For example, the first individual conductor of the second two-conductor line can also be electrically connected to a third connection terminal of the second measurement transmitter electrically connected with the interface circuit of the second measurement transmitter and the second individual conductor of the second two-conductor line can also be connected to the second connection terminal of the second measurement transmitter.

In a fifth embodiment of the measuring-device system of the invention, it is, furthermore, provided that the interface circuit of the first measurement transmitter is adapted to process, for example, to transmit and/or to receive, electrical current signals modulated in conformance with the standard, IEC 61784-1 CPF1.

In a sixth embodiment of the measuring-device system of the invention, it is, furthermore, provided that the interface circuit of the first measurement transmitter is adapted to process, for example, to transmit and/or to receive, electrical current signals modulated in conformance with the standard, IEC 61784-1 CPF3.

In a seventh embodiment of the measuring-device system of the invention, it is, furthermore, provided that the interface circuit of the first measurement transmitter is adapted to process, for example, to transmit and/or to receive, electrical current signals modulated in conformance with the standard, IEC 61158.

In an eighth embodiment of the measuring-device system of the invention, it is, furthermore, provided that the interface circuit of the first measurement transmitter is adapted to process, for example, to transmit and/or to receive, electrical current signals modulated by means of frequency shift keying (FSK), for example, electrical current signals modulated in conformance with the standard, IEC 61784-1 CPF9 and/or IEC 61158.

In a ninth embodiment of the measuring-device system of the invention, it is, furthermore, provided that the interface circuit of the second measurement transmitter is adapted to process, for example, to transmit and/or to receive, electrical current signals modulated by means of frequency shift keying (FSK), for example, electrical current signals modulated in conformance with the standard, IEC 61784-1 CPF9 and/or IEC 61158.

In a tenth embodiment of the measuring-device system of the invention, it is, furthermore, provided that the radio unit of the second measurement transmitter is adapted to process, for example, to transmit and/or to receive, radio signals conforming to at least one of the standards: IEEE 802.15.4, for example, WPAN, wireless HART or ZigBee, IEEE 802.11, for example, WLAN or WiFi, and IEEE 802.15.1, for example, Bluetooth.

In an eleventh embodiment of the measuring-device system of the invention, it is, furthermore, provided that the first measurement transmitter is adapted to transmit the output signal to the evaluating- and supply electronics by load modulation of a loop current, namely by modulation of an electrical current in the electrical current loop driven by the evaluating- and supply electronics, for example, in such a manner that the loop current is set as a function of the first measured variable by means of the interface circuit of the first measurement transmitter to an electrical current level lying within a range 4-20 mA.

In a twelfth embodiment of the measuring-device system of the invention, it is, furthermore, provided that the second measurement transmitter is adapted to ascertain a value, for example, an instantaneous value and/or an effective value, of an electrical power instantaneously supplied via an interface circuit of the second measurement transmitter from the electrical current loop and/or an electrical current level of an input electrical current of the interface circuit of the second measurement transmitter.

In a thirteenth embodiment of the measuring-device system of the invention, it is, furthermore, provided that the interface circuit of the first measurement transmitter is adapted to output the output signal serving as measurement signal as a standardized signal, for example as a signal standardized to conform to DIN IEC 60381-1:1985-11, for example, as an electrical current signal. Developing this embodiment of the measuring-device system of the invention, it is, furthermore, provided that the interface circuit of the first measurement transmitter is adapted to output its output signal serving as measurement signal as an electrical current signal, for example, a 4-20 mA-electrical current signal conforming to DIN IEC 60381-1:1985-11, for example, in such a manner that the measurement signal for the measured variable is a switching signal with binary coding of only two discrete values, namely nominally an electrical current level of the electrical current of the output signal of 4 mA or 20 mA.

In a fourteenth embodiment of the measuring-device system of the invention, it is, furthermore, provided that the electrical current loop involves at least also the interface circuit of the second measurement transmitter, for example, in such a manner that the interface circuit of the first measurement transmitter and the interface circuit of the second measurement transmitter are electrically connected in series, for example, in such a manner that an electrical current in the electrical current loop driven by the evaluating- and supply electronics corresponds both to an electrical current of the output signal of the interface circuit of the first measurement transmitter as well as also an input electrical current of the interface circuit of the second measurement transmitter. Developing this embodiment of the measuring-device system of the invention, it is, furthermore, provided that the interface circuit of the second measurement transmitter is adapted to carry, simultaneously with the interface circuit of the first measurement transmitter, the electrical current of its output signal and/or an electrical current in the electrical current loop driven by the evaluating- and supply electronics.

In a fifteenth embodiment of the measuring-device system of the invention, it is, furthermore, provided that the second measurement transmitter includes a storage circuit electrically connected with its interface circuit, for example, a storage circuit having one or more rechargeable electrochemical storers and/or one or more super capacitors, wherein the storage circuit is adapted to store electrical energy drawn from the interface circuit of the second measurement transmitter and, for example, to supply electrical energy required for generating the second transducer signal and/or the radio signal, for example, in case an electrical power instantaneously supplied via an interface circuit of the second measurement transmitter from the electrical current loop does not cover an instantaneous need of the second measuring device for electrical power and/or in case an electrical current level of an input electrical current of the interface circuit of the second measurement transmitter does not reach a predetermined minimum value.

In a sixteenth embodiment of the measuring-device system of the invention, it is, furthermore, provided that the first measurement transmitter meets ignition protection type, "device protection by intrinsic safety (Exi-)", according to EN 60079 11:2012 and/or ignition protection type, "increased safety (Ex e-)", according to EN 60079-7:2007.

In a seventeenth embodiment of the measuring-device system of the invention, it is, furthermore, provided that the second measurement transmitter meets ignition protection type, "device protection by intrinsic safety (Exi-)", according to EN 60079-11:2012 and/or ignition protection type, "increased safety (Ex e-)", according to EN 60079-7:2007.

In an eighteenth embodiment of the measuring-device system of the invention, it is, furthermore, provided that the first measuring device has a first transmitter housing, within which the first measurement transmitter is accommodated, at least in part, for example, a pressure resistant and/or explosion resistant, first transmitter housing and/or one protecting against penetration of dust in damaging amounts and/or against penetration of water spray from all sides and/or at least meeting the requirements of protection type IP 54 according to DIN EN 60529:2014-09 and/or the requirements of ignition protection type, "pressure resistant encapsulation (Ex d-)", according to EN 60079-1:2007 and/or solidly connected with the first measuring transducer.

In a nineteenth embodiment of the measuring-device system of the invention, it is, furthermore, provided that the second measuring device has a second transmitter housing, within which the second measurement transmitter is accommodated at least in part, for example, a pressure resistant and/or explosion resistant, second transmitter housing and/or one protecting against penetration of dust in damaging amounts and/or against penetration of water spray from all sides and/or at least meeting the requirements of protection type IP 54 according to DIN EN 60529:2014-09 and/or the requirements of ignition protection type, "pressure resistant encapsulation (Ex d-)", according to EN 60079-1:2007 and/or located remotely from the first transmitter housing by more than 1 m (meter) and/or solidly connected with the second measuring transducer.

In a twentieth embodiment of the measuring-device system of the invention, it is, furthermore, provided that the second measurement transmitter is adapted to monitor an input voltage and/or an input electrical current of the interface circuit of the second measurement transmitter, for example, via the radio unit to transmit an alarm-radio signal, namely electromagnetic, free-space waves wirelessly transmitting news announcing a defect of the measuring-device system, in case the input voltage has subceeded a predetermined minimum value and/or in case the input voltage has exceeded a predetermined maximum value and/or in case the input electrical current has subceeded a predetermined minimum value and/or in case the input electrical current has exceeded a predetermined maximum value.

In a twenty-first embodiment of the measuring-device system of the invention, it is, furthermore, provided that the first measuring device is adapted to operate at times in a first operating mode, in which the first measurement transmitter delivers the measurement signal with a signal level, for example, representing the first measured variable, for example, an electrical current level of an electrical current in the electrical current loop, which is greater than a predetermined minimum value, for example, in such a manner that the electrical power supplied by the evaluating- and supply electronics in the electrical current loop amounts to greater than 100 mW and/or that an electrical current level of an electrical current in the electrical current loop amounts to 20 mA, and that the second measuring device is adapted at times to operate in a first operating mode, in which the second measuring transducer provides the second transducer signal and in which the second measurement transmitter receives the second transducer signal and converts such at least into the radio signal, wherein the second measuring device is adapted, furthermore, for example, solely, to operate in the first operating mode, when the first measuring device operates in its first operating mode, and/or to operate in the second operating mode while the first measuring device operates in its second operating mode.

In a twenty-second embodiment of the measuring-device system of the invention, it is, furthermore, provided that the second measuring device is adapted at times to operate in a first operating mode, in which the second measuring transducer provides the second transducer signal and in which the second measurement transmitter receives the second transducer signal and converts such at least into the radio signal. Developing this embodiment of the measuring-device system of the invention, it is, furthermore, provided that the second measuring device is adapted at times to operate not in the first operating mode and during that to operate at least at times in a second operating mode, in which the second measuring transducer does not provide the second transducer signal and/or in which the second measurement transmitter does not convert the second transducer signal into the radio signal, and/or that the second measurement transmitter is adapted in the second operating mode of the second measuring device to convert the output signal of the interface circuit of the first measurement transmitter into a substitute-radio signal, namely electromagnetic, free-space waves transmitted via the radio unit and wirelessly transmitting a sequence of measured values quantifying the first measured variable, for example, also in such a manner that the radio unit of the second measurement transmitter transmits the substitute-radio signal with an adaptable radiative power and/or with a radiative power amounting to less than 100 mW and/or with a radiative power lessened in comparison with a radiative power with which the radio signal is transmitted. Alternatively or supplementally, the second measuring device, thus, for instance, its measurement transmitter, can, furthermore, be adapted, as a function of the second measured variable and/or as a function of at least one operating parameter ascertained by the second measurement transmitter, for example, from the second transducer signal and/or based on an input electrical current of the interface circuit of the second measurement transmitter, and representing an electrical power withdrawable via interface circuit, for example, an operating parameter in the form of an electrical current level of an input electrical current of the interface circuit of the second measurement transmitter or a parameter value derived therefrom, automatically to deactivate the first operating mode and/or to activate the second operating mode, for example, in case the second measurement transmitter detects that an electrical power instantaneously supplied via an interface circuit of the second measurement transmitter from the electrical current loop does not cover an electrical power required by the second measuring device operating in the first operating mode and/or that an electrical current level of an electrical current in the electrical current loop does not reach a predetermined minimum value, and/or the second measuring device, thus, for instance, its measurement transmitter, can be adapted, as a function of the at least one operating parameter, automatically to deactivate the second operating mode and/or to activate the first operating mode, for example, in case the second measurement transmitter detects that an electrical power instantaneously supplied via an interface circuit of the second measurement transmitter from the electrical current loop can cover the electrical power required by the second measuring device operating in the first operating mode and/or that an electrical current level of an input electrical current of the interface circuit of the second measurement transmitter has achieved or exceeded a predetermined minimum value.

In a twenty-third embodiment of the measuring-device system of the invention, it is, furthermore, provided that the first measuring device is adapted at times to operate in a first operating mode, in which the first measurement transmitter delivers the measurement signal with a signal level, for example, a signal level representing the first measured variable, for example, an electrical current level of an electrical current in the electrical current loop, which is greater than a predetermined minimum value, for example, in such a manner that the electrical power supplied from the evaluating- and supply electronics in the electrical current loop amounts to more than 100 mW and/or that an electrical current level of an electrical current in the electrical current loop amounts to 20 mA. Developing this embodiment of the measuring-device system of the invention, it is, furthermore, provided that the first measuring device is adapted at times not to operate in the first operating mode and during that to operate at least at times in a second operating mode, in which the first measurement transmitter delivers the measurement signal with a signal level, for example, a signal level representing the first measured variable, for example, an electrical current level of an electrical current in the electrical current loop, which is less than the minimum value, for example, in such a manner that the electrical power supplied by the evaluating- and supply electronics in the electrical current loop amounts to less than 100 mW and/or that an electrical current level of an electrical current in the electrical current loop amounts to 4 mA.

In a twenty-fourth embodiment of the measuring-device system of the invention, it is, furthermore, provided that the evaluating- and supply electronics is adapted to process, especially to receive and to evaluate, the radio signal of the second measuring device, especially, with application of the radio signal, to ascertain, or to win, from the radio signal, measured values, in given cases, also digital, measured values, representing the second measured variable.

In a first embodiment of the measuring assembly of the invention, it is, furthermore, provided that the first measuring transducer is located more than 1 m (meter) from the second measuring transducer.

In a second embodiment of the measuring assembly of the invention, it is, furthermore, provided that the first measurement transmitter is located more than 1 m from the second measurement transmitter.

In a third embodiment of the measuring assembly of the invention, it is, furthermore, provided that the first measurement transmitter is located more than 1 m from the evaluating- and supply electronics.

In a fourth embodiment of the measuring assembly of the invention, it is, furthermore, provided that the second measurement transmitter is located more than 1 m from the evaluating- and supply electronics.

In a fifth embodiment of the measuring assembly of the invention, it is, furthermore, provided that the first measurement transmitter is located less than 1 m from the first measuring transducer.

In a sixth embodiment of the measuring assembly of the invention, it is, furthermore, provided that the second measurement transmitter is located less than 1 m from the second measuring transducer.

A basic idea of the invention is to provide a (hybrid) measuring-device system, in the case of which, on the one hand, the measuring devices are supplied with electrical energy together via a conventional electrical current loop and in the case of which, on the other hand, each of the measuring devices can, at least within an earlier specified (normal) operation and measuring range draw electrical power uniformly and in always sufficient measure both for fast and precise measurements as well as also for rapid transmission of measurement results. Advantageously, also the situation can be utilized by the measuring-device system of the invention that, outside of the above mentioned operating range, actually also no detailed measuring is required, but rather only a suitable signaling of the alarm state. The signaling of the alarm state is, in turn, directly implementable with only a small available electrical power. A further advantage of the invention, is among others that, on the one hand, the effort as regards the electrical connection of the measuring devices to the particular evaluating- and supply electronics is less compared with measuring-device systems, or measuring assemblies, formed with conventional hybrid measuring devices. On the other hand, the one or more measured variables can nevertheless be registered with a high updating rate very precisely and measured values derived therefrom can be transmitted per radio at a high transmission rate and high transmission range; this, in given cases, also for the case, in which each of the measuring devices satisfies ignition protection type, "device protection by intrinsic safety (Exi-)", according to EN 60079 11:2012, thus in the case where only small amounts of energy are allowed to be stored. A further advantage of the invention is also that the measuring-device system, and the corresponding measuring assembly, can, in each case, be implemented also by means of measuring devices conventional as regards hardware, not least of all also by means of conventional, programmable, two-conductor-field devices and/or by means of conventional hybrid field devices, as well as also by means of conventional evaluating- and supply electronics.

BRIEF DESCRIPTION OF THE DRAWINGS

The invention as well as advantageous embodiments thereof will now be explained in greater detail based on examples of embodiments shown in the figures of the drawing. Equal, or equally acting or equally functioning, parts are provided in all figures with equal reference characters; when perspicuity requires or it otherwise appears sensible, reference characters already shown in earlier figures are omitted in subsequent figures. Other advantageous embodiments or further developments, especially also combinations of, firstly, only individually explained aspects of the invention, result, furthermore, from the figures of the drawing and/or from claims per se.

The figures of the drawing show as follows.

DETAILED DESCRIPTION

Figure 1:
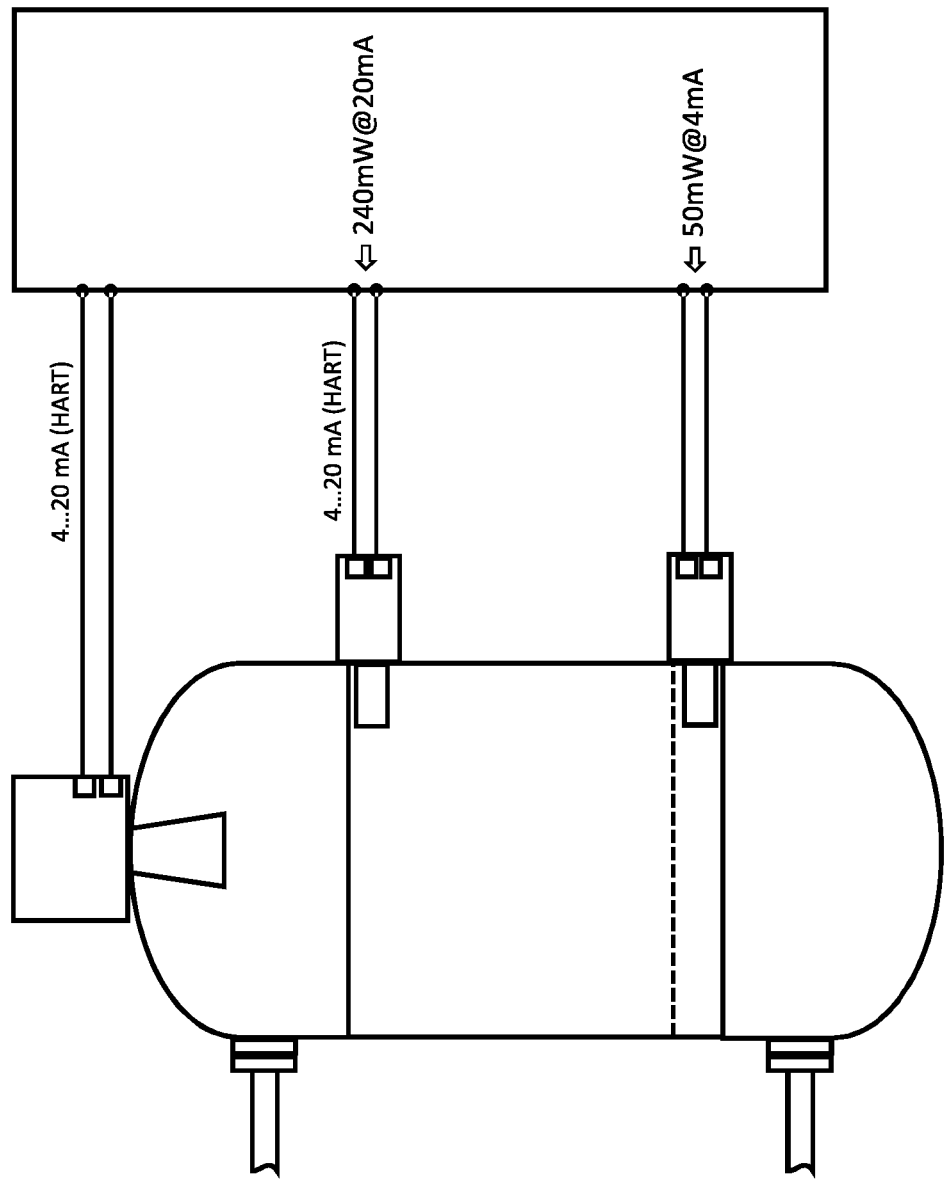
FIGS. 1, 2 and 3 show schematically in each case, according to the state of the art, a measuring-device system and a measuring assembly formed therewith.
Figure 2:
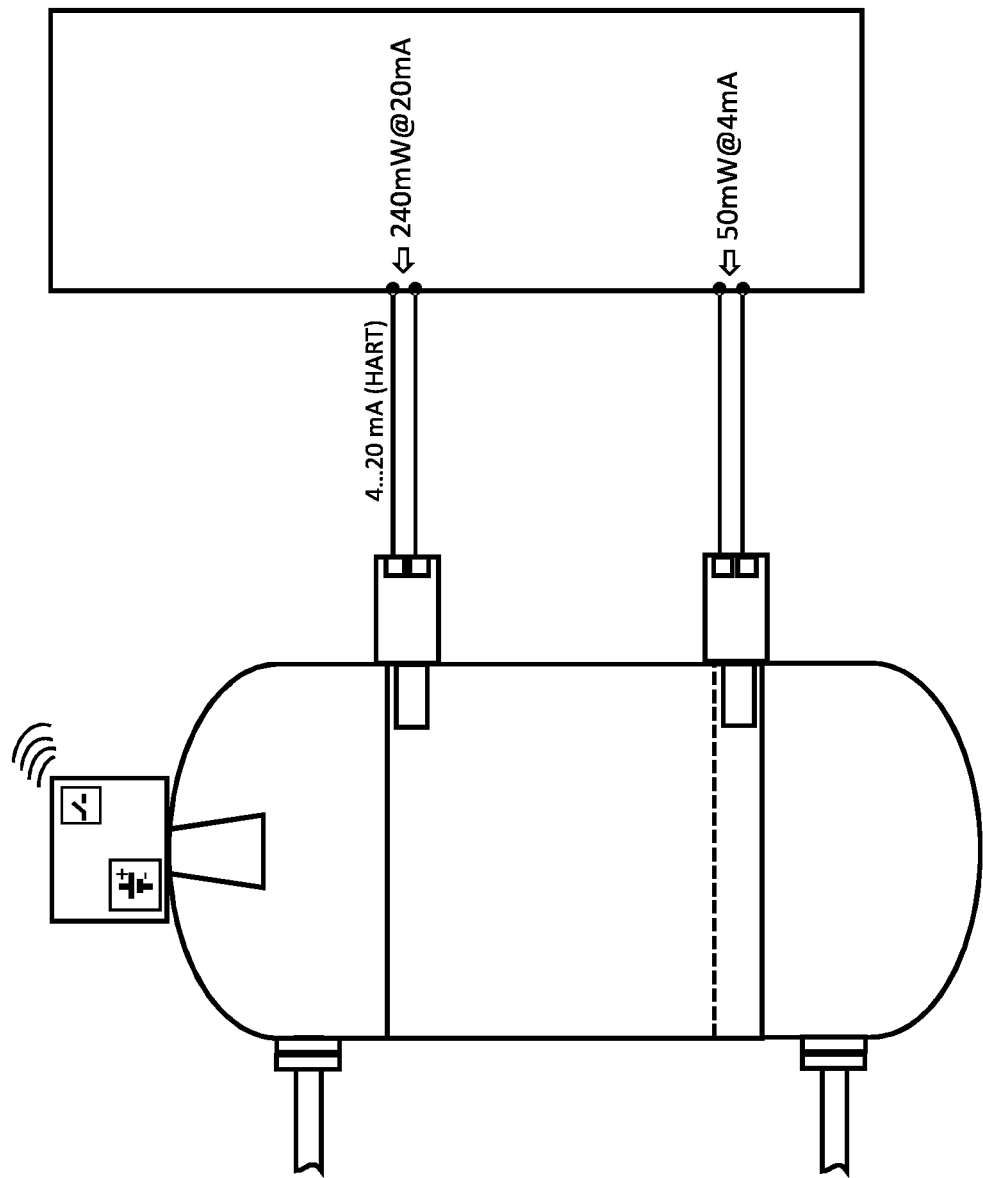
Figure 3:
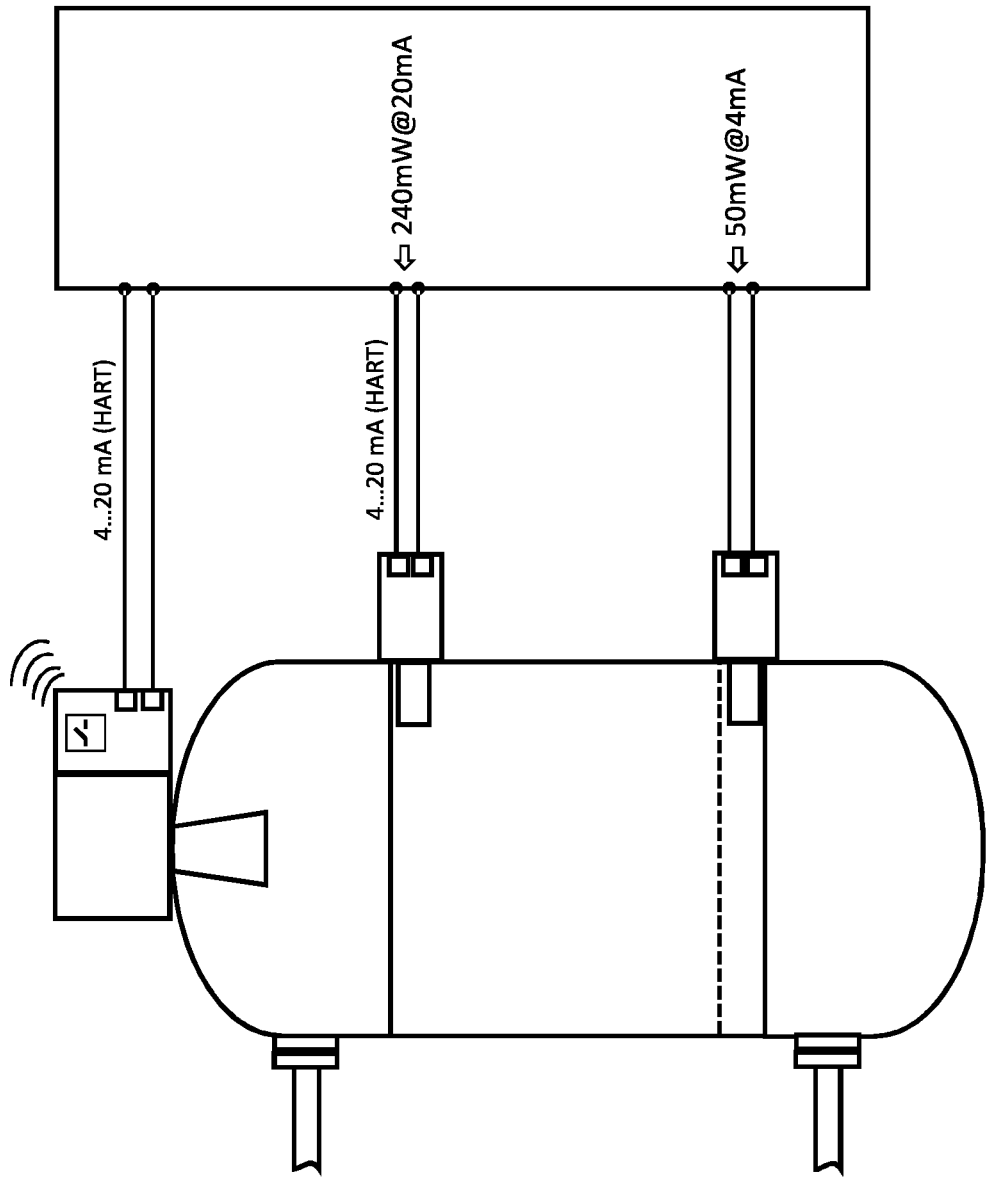
Figure 4:
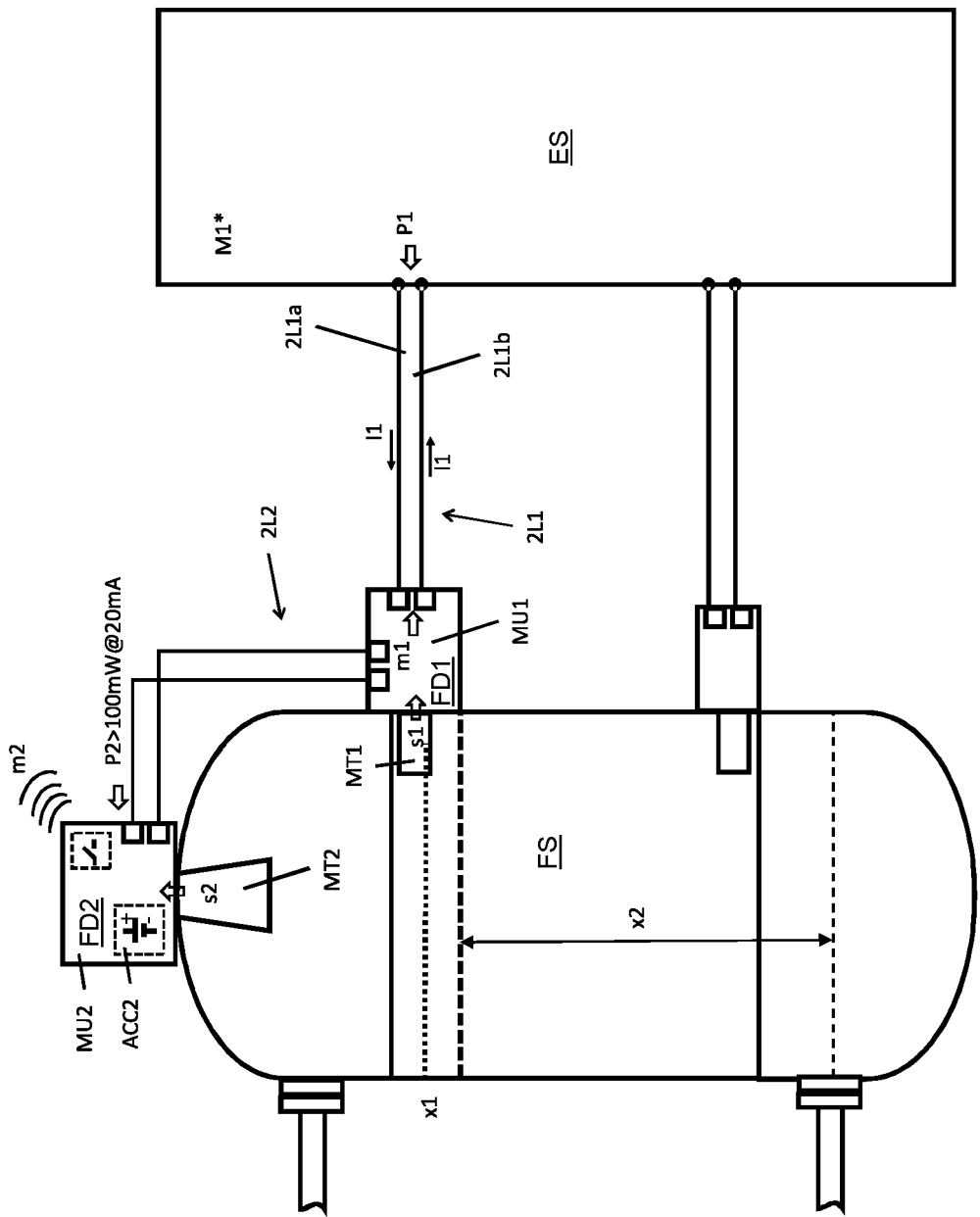
FIG. 4 shows schematically according to the present disclosure, an example of an embodiment of a measuring-device system and a measuring assembly formed therewith.
Figure 5:
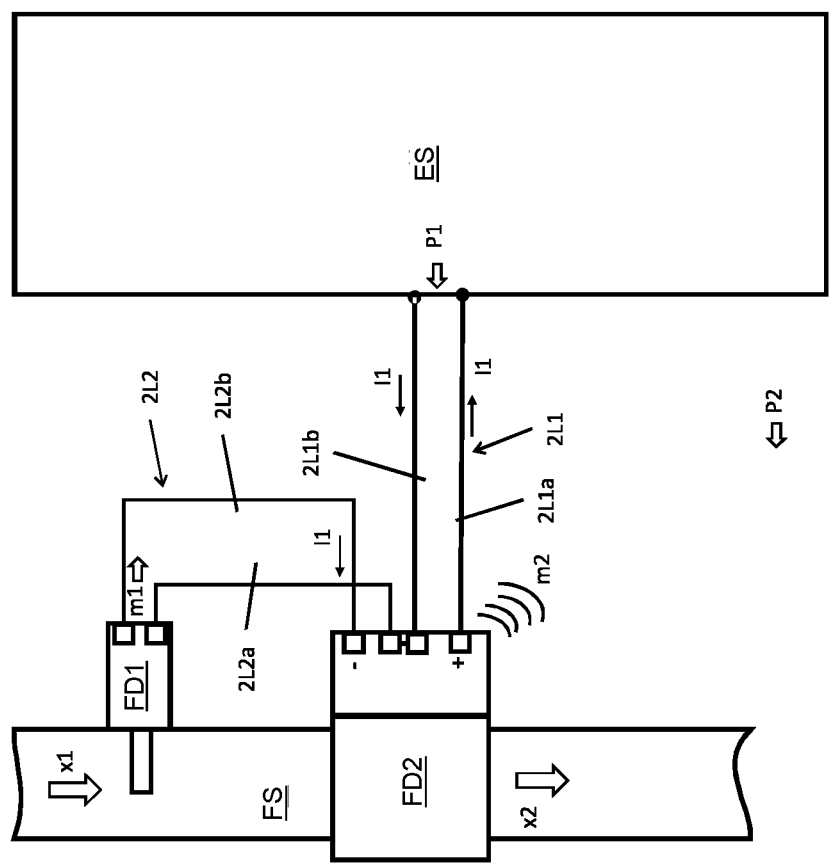
FIG. 5 shows schematically according to the present disclosure, another example of an embodiment of an measuring-device system and a measuring assembly formed therewith.

FIGS. 4 and 5 show schematic examples of embodiments for measuring-device systems of the invention formed in each case by means of a first measuring device FD1, a second measuring device FD2 and an evaluating- and supply electronics ES. By means of the measuring-device system, as well as also shown in FIGS. 4 and 5, in each case, furthermore, a measuring assembly can be formed, which comprises, besides the measuring devices FD1, FD2 and the evaluating- and supply electronics ES, a flow system serving for conveying a flowable medium. The flow system FS can, such as shown in FIG. 4, be formed, for example, by means of a supply container, namely, for example, a tank, a silo or a vat, and/or, as well as also shown in FIG. 5, for example, by means of a transport route, for example, a pipeline or a flume.

Figure 6:
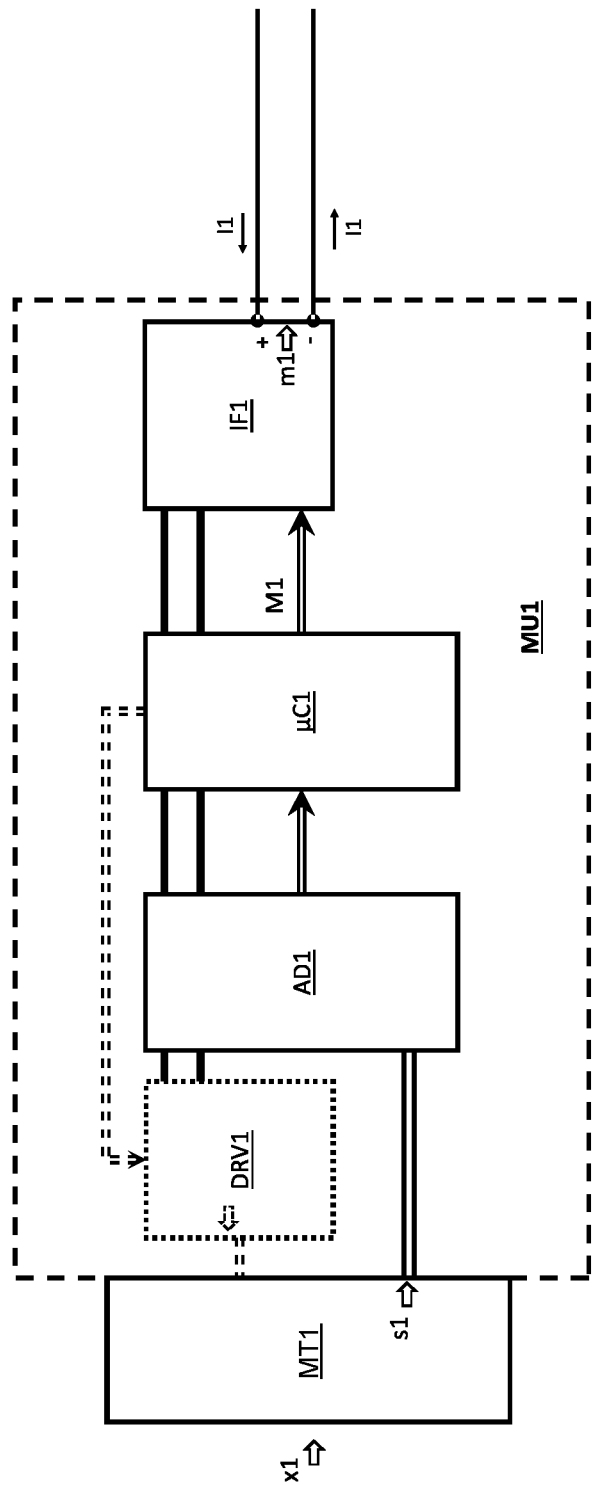
FIG. 6, 7 shows schematic examples of embodiments of measurement transmitters suitable for a measuring-device system of the present disclosure.
Figure 7:
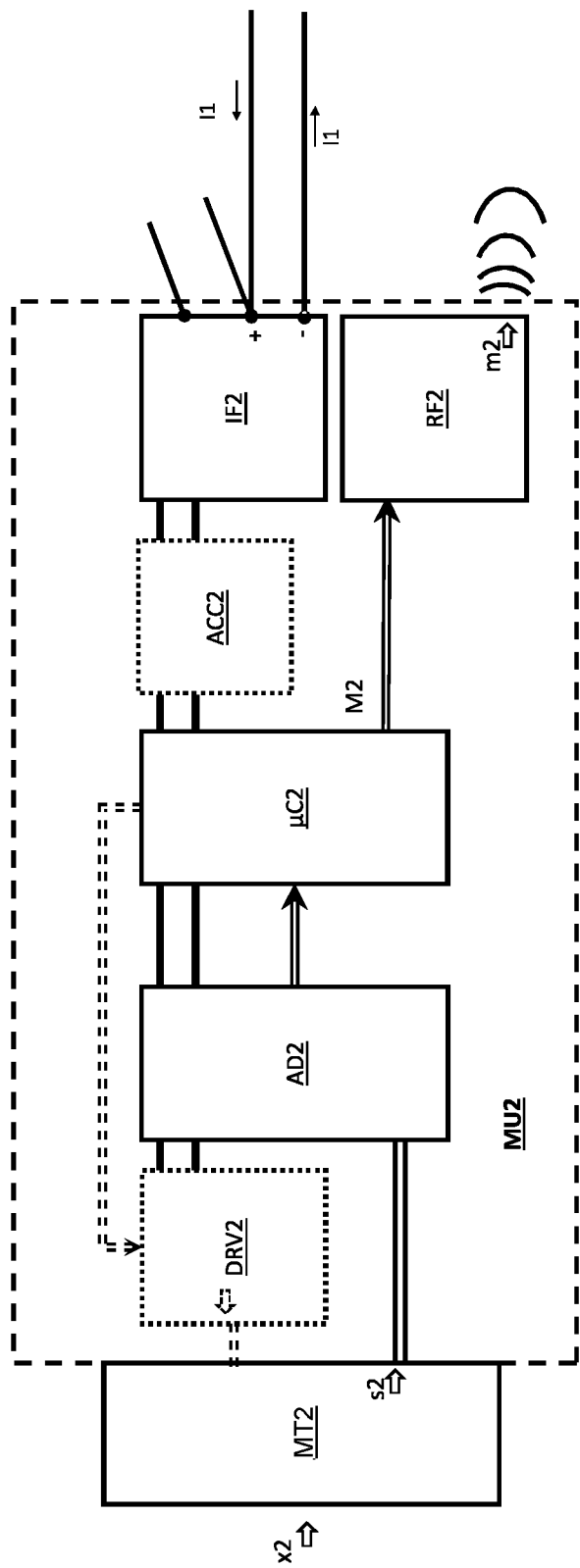

The measuring device FD1 includes a first measured variable transducer MT1 and a first measurement transmitter MU1 electrically connected with the measured variable transducer MT1, for example, as well as also schematically shown in FIG. 6, formed by means of at least one analog to digital converter AD1 and/or by means of at least one microprocessor uC1, and the measuring device FD2 includes a second measured variable transducer MT2 and a second measurement transmitter MU2 electrically connected with the measured variable transducer MT2, for example, as well as also schematically shown in FIG. 7, formed by means of at least one analog to digital converter AD2 and/or by means of at least one microprocessor uC2. The measured variable transducer MT1 is adapted to react to a first measured variable x1 and to provide a first transducer signal s1, especially an electrical, first transducer signal s1, in such a manner that the transducer signal s1 follows a change of the measured variable x1 with a change of at least one signal parameter, for example, a signal amplitude and/or a signal frequency, while the measured variable transducer MT2 is adapted to react to a second measured variable x2 and to provide a second transducer signal s2, especially an electrical, second transducer signal s2, in such a manner that the transducer signal s2 follows a change of the measured variable x2 with a change of at least one signal parameter, for example, a signal amplitude and/or a signal frequency. As shown in FIGS. 4 and 5, the measuring transducer MT1 and the measuring transducer MT2 can be applied together in the same flow system, in given cases, also spaced from one another, for example, also in such a manner that the measuring transducer MT1 is located more than 1 m (meter) from the measuring transducer MT2 and/or that the measurement transmitter MU1 is located more than 1 m from the measurement transmitter MU2 and/or that the measurement transmitter MU1 is located more than 1 m from the evaluating- and supply electronics ES and/or that the measurement transmitter MU2 is located more than 1 m from the evaluating- and supply electronics ES and/or that the measurement transmitter MU1 is located less than 1 m from the measuring transducer MT1 and/or that the measurement transmitter MU2 is located less than 1 m from the measuring transducer MT2.

The measuring transducer MT1 can be an active transducer, namely one operating without auxiliary energy, or, for example, also a passive transducer, namely one operating with auxiliary energy delivered from a corresponding driver circuit DRV1; equally also the measuring transducer MT2 can be an active transducer or a passive transducer needing auxiliary energy provided from a corresponding driver circuit DRV2. Both the measuring device FD1 as well as also the measuring device FD2 can, furthermore, have first and second transmitter housings, respectively, for example, also such solidly connected with the associated measuring transducers, within which housings the measurement transmitters MU1 and MU2, respectively, are, at least partially, for example, also completely, accommodated. Each of these transmitter housings can, additionally, such as quite usual in the case of measuring devices of the type being discussed, be embodied, for example, also as a pressure resistant and/or explosion safe transmitter housing and/or a transmitter housing protecting against penetration of dust in damaging amounts and/or against penetration of water spray from all sides and/or a transmitter housing at least meeting the requirements of protection type IP 54 according to DIN EN 60529:2014-09 and/or the requirements of ignition protection type, "pressure resistant encapsulation (Ex d-)", according to EN 60079-1:2007. Alternatively or supplementally, the measurement transmitter MU1 and/or the measurement transmitter MU2 can, in each case, also satisfy the requirements of ignition protection type, "device protection by intrinsic safety (Exi-)", according to EN 60079 11:2012 and/or the ignition protection type, "increased safety (Ex e-)", according to EN 60079-7:2007 and/or at least partially enclose its associated measuring transducer MT1, MT2.

The measured variable x1 and/or measured variable x2 to be registered by means of the measuring-device system of the invention can be, for example, substance parameters characterizing a medium, for example, a gas, a liquid or a dispersion, conveyed in the above described flow system FS. Examples of such parameters include, for instance, pH-value, oxygen-content, electrical conductivity, density or viscosity, and even process parameters associated with a medium conveyed in the aforementioned flow system, such as, for instance, a temperature, a pressure, or, such as shown in FIG. 4 and FIG. 5, for example, a fill level (FIG. 4), or a volume- or mass flow (FIG. 5). Examples of the measuring devices FD1 and FD2 include a fill level measuring device, especially a radar based, fill level measuring device, and a flow measuring device, especially a vibronic, thermal, magnetically inductive- or acoustic, flow measuring device. In an embodiment of the measuring-device system of the invention, the measured variable x1 is, for example, the result of a comparison, which serves for pump protection, overfill prevention or leakage monitoring and which has a correspondingly predetermined limit- or threshold value, thus a Boolean variable assuming only two, alternating values, or states, for example, "limit value achieved" or "limit value not achieved". In the case of the measured variable x1, it can, accordingly, involve a limit level, such as shown in FIG. 4, or a flow limit, such as shown in FIG. 5. Furthermore, the measured variable x2 can, additionally, also have a value range containing the particular measured variable x1, and the measured variable x1 can also be a result of a comparison with a limit- or threshold value predetermined for the particular measured variable x2. Accordingly, the measuring device FD1 can, such as shown schematically in FIG. 4, also be embodied as a switch device, for example, as a vibronic or capacitive fill level limit switch, as a pressure switch or, such as shown schematically in FIG. 5, be a thermal, vibronic or magnetically inductive, flow switch.

The measurement transmitter MU1, for example, a programmable measurement transmitter MU1, includes, such as shown schematically in FIG. 6, an interface circuit IF1, for example, one embodied as a switch output and/or a TTY-interface. Interface circuit IF1 serves both for wired energy supply as well as also for wired signal transmission, and is, additionally, adapted to receive the transducer signal s1 and to convert such into a measurement signal m1, namely an electrical output signal of the interface circuit representing the measured variable x1. Particularly for the above described case, in which the measured variable x1 corresponds to a Boolean variable, the output signal serving as measurement signal m1 can be embodied as a binary coded, switching signal. The interface circuit IF1 of the measurement transmitter MU1 is as shown in FIGS. 4, 5 and 6, in each case, or such as directly evident from their combination, additionally electrically connected to the evaluating- and supply electronics ES to form an electrical current loop 2L involving both the interface circuit as well as also the evaluating- and supply electronics. The evaluating- and supply electronics ES is, in turn, especially adapted to supply electrical power P1, for example, with an electrical voltage of greater than 12 V (volt) and/or less than 45 V, into the electrical current loop 2L. Moreover, the measurement transmitter MU1 is, furthermore, adapted by means of the interface circuit IF1 to draw both electrical power from the electrical current loop 2L as well as also to transmit the measurement signal m1 to the evaluating- and supply electronics, for example, by modulation of a loop current I1, namely an electrical current in the electrical current loop 2L driven by the evaluating- and supply electronics ES. Accordingly, the interface circuit IF1 of the measurement transmitter MU1 is, according to an additional embodiment of the measuring-device system of the invention, adapted to output the output signal serving as measurement signal m1 in the form of a standardized signal, for example, a signal also conforming to DIN IEC 60381-1:1985-11. Serving as standardized signal can be, for example, a 4-20 mA-electrical current signal, namely a loop current I1 set by means of the interface circuit IF1 as a function of the measured variable x1 to an electrical current level lying within a range 4-20 mA. For the above described case, in which the measurement signal m1 is embodied as a switching signal, the only two discrete values for the measured variable x1 can then be correspondingly binary coded, for example, with electrical current levels of the electrical current I1 of nominally 4 mA or 20 mA. In an additional embodiment of the measuring-device system of the invention, the interface circuit IF1 of the measurement transmitter MU1 is adapted to process, especially to transmit and/or to receive, electrical current signals modulated in conformance with at least one of the standards IEC 61784-1 CPF1 (FOUNDATION Fieldbus), IEC 61784-1 CPF3 (PROFIBUS, PROFINET), IEC 61784 1 CPF9 (HART), or IEC 61158, for example, also modulated by means of frequency shift keying (FSK). Alternatively or supplementally, also the interface circuit IF2 can be adapted to process its electrical current signals modulated by means of frequency shift keying (FSK), for example, also modulated in conformance with IEC 61784-1 CPF9 and/or IEC 61158. In an additional embodiment of the measuring-device system of the invention, the measuring device FD1 is, furthermore, adapted at times to operate in a first operating mode, in which the measurement transmitter MU1 delivers the measurement signal m1 with a signal level, especially a signal level representing the measured variable x1, for example, an electrical current level of the loop current I1, which is greater than a predetermined minimum value, for example, in such a manner that an electrical current level of the loop current I1 amounts to more than 10 mA, for example, 20 mA, and/or that the electrical power P1 supplied from the evaluating- and supply electronics ES into the electrical current loop is greater than 100 mW, for example, greater than 200 mW (P1≥20 mA·12 V). Especially, the measuring device FD1 is, additionally, also adapted to operate at times not in the above described, first operating mode and then at least at times to operate in a second operating mode, namely in an operating mode, in which the measurement transmitter MU1 delivers the measurement signal with a signal level, especially a signal level representing the measured variable x1, for example, an electrical current level of the loop current I1, which lies below the above described minimum value, for example, in such a manner that an electrical current level of the loop current I1 amounts to less than 10 mA, for example, 4 mA, and/or that the electrical power P1 supplied by the evaluating- and supply electronics ES into the electrical current loop amounts to less than 100 mW, for example, less than 50 mW (P1≤4 mA·12 V). For the above described case, in which the measuring device FD1 is embodied as a switch device, such that the measurement signal m1 is a switching signal, the first operating mode can, for example, correspond to an electrical current level of the electrical loop current I1 of nominally 20 mA and/or the second operating mode can correspond to an electrical current level of the electrical loop current I1 of nominally 4 mA.

As shown, among others, schematically in FIG. 7, the, for example, programmable, measurement transmitter MU2 of the measuring device FD2 includes likewise an interface circuit IF2, for example, one embodied as a TTY-interface. The interface circuit IF2 of the measurement transmitter MU2 is, as well as also shown, in each case, in FIGS. 4, 5 and 7, or such as directly evident from their combination, furthermore, electrically connected to the measurement transmitter MU1, for example, to its interface circuit IF1 and/or to the electrical current loop 2L formed therewith. Additionally, the measurement transmitter MU2, thus, for instance, its interface circuit IF2, is likewise adapted to draw electrical power P2 from the above described electrical current loop 2L.

In an additional embodiment of the measuring-device system of the invention, the interface circuit IF2 of the measurement transmitter MU2 is adapted simultaneously with the interface circuit IF1 of the measurement transmitter MU1 to carry the electrical current of its output signal, i.e. the loop current I1 driven by the evaluating- and supply electronics ES. Especially, it is, furthermore, provided that the electrical current loop 2L involves at least also the interface circuit IF2 of the measurement transmitter MU2, for example, also in such a manner that the interface circuit IF1 and the interface circuit IF2 are connected electrically in series, thus that the above-mentioned loop current IF1, as well as also in FIG. 5 indicated, or evident from a combination of FIGS. 6 and 7—corresponds both to an input electrical current of the interface circuit IF1 (and to the electrical current of the output signal of the interface circuit IF1) as well as also to an input electrical current of the interface circuit IF2. In an additional embodiment, the interface circuit IF2 is, moreover, also adapted to register the above described input electrical current, i.e. the loop current I1, for example, also in order to control the measuring transducer MT2 as a function of an instantaneous electrical current level of the above described loop current I1. Alternatively or supplementally, the measurement transmitter MU2 can, additionally, also be adapted to ascertain a value, for example, an instantaneous value and/or an effective value, of an electrical power and/or an electrical current level of an input electrical current of the interface circuit IF2 and/or an input voltage the interface circuit IF2 instantaneously supplied via an interface circuit IF2 from the electrical current loop 2L, or to monitor the aforementioned electrical power, electrical current level and/or input voltage, for example, concerning the maintaining of a correspondingly predetermined minimum—and/or maximum value. In an additional embodiment of the measuring-device system of the invention, the measurement transmitter MU2 includes a storage circuit ACC2 electrically connected with its interface circuit. The storage circuit ACC2 can have, for example, one or more rechargeable electrochemical storers and/or one or more super capacitors, and is, especially, provided to store electrical energy drawn from the interface circuit IF2 and to supply electrical energy, for example, for generating the transducer signal s2 and/or for performing other functions of the measurement transmitter MU2, for example, for the case, in which an electrical power P2 instantaneously supplied via an interface circuit IF2 from the electrical current loop 2L does not cover an instantaneous requirement of the measuring device FD2 for electrical power and/or in case, such as already indicated, an electrical current level of an input electrical current of the interface circuit IF2 does not reach a predetermined minimum value.

Of course, in case required, such a storage circuit can also be provided in the measurement transmitter MU1.

In an additional embodiment of the measuring-device system of the invention, it is, furthermore, provided that the electrical current loop 2L has at least one, first two-conductor line 2L1 formed of two individual conductors, for example, also twisted about one another, and both a first individual conductor 2L1a of the two-conductor line 2L1 as well as also a second individual conductor 2L1b of the two-conductor line 2L1 are electrically connected to the evaluating- and supply electronics ES, for example, also in such a manner that the individual conductor 2L1a forms a supply line of the electrical current loop and/or that the individual conductor 2L1b forms a return line of the electrical current loop 2L1, or that, conversely, the individual conductor 2L1b forms a supply line of the electrical current loop and the individual conductor 2L1a a return line of the electrical current loop 2L1. At least the individual conductor 2L1a can, such as shown in FIG. 5, also be electrically connected directly to the measurement transmitter MU2, for example, to a first connection terminal (+) of the measurement transmitter MU2 electrically connected with the interface circuit IF2 of the measurement transmitter MU2. Additionally, also the individual conductor 2L1b can be led to the measurement transmitter MU2, equally as well, not electrically connected with its interface circuit, for example, electrically connected to a second connection terminal of the measurement transmitter MU2 not electrically connected with the interface circuit IF2 of the measurement transmitter MU2. The individual conductor 2L1a can, however, also, as well as also shown in FIG. 4, be led directly to the measurement transmitter MU1, for example, to a first connection terminal of the measurement transmitter MU1 electrically connected with the interface circuit IF1 of the measurement transmitter MU1. Additionally, also the individual conductor 2L1b can be led directly to the measurement transmitter MU1, for example, also in such a manner that the individual conductor 2L1b is electrically connected to a second connection terminal of the measurement transmitter MU1, in given cases, not electrically connected with the interface circuit IF1 of the measurement transmitter MU1. In an additional embodiment of the measuring-device system of the invention, the electrical current loop 2L includes, furthermore, at least one, second two-conductor line 2L2 formed of two individual conductors, for example, twisted about one another. As shown in each case in FIGS. 4 and 5, both a first individual conductor 2L2a of the two-conductor line 2L2 as well as also a second individual conductor 2L2b of the two-conductor line 2L2 can be electrically connected to the measurement transmitter MU1, for example, in such a manner that the individual conductor 2L2a is electrically connected to a first connection terminal of the measurement transmitter MU1 electrically connected with the interface circuit IF1 of the measurement transmitter MU1 and the individual conductor 2L2b is electrically connected on a second connection terminal of the measurement transmitter MU1 electrically connected with the interface circuit IF1 of the measurement transmitter MU1. Moreover, the individual conductor 2L2a can, additionally, also be electrically connected to a third connection terminal of the second measurement transmitter electrically connected with the interface circuit IF2 of the measurement transmitter MU2 and the individual conductor 2L2b also to the above-mentioned second connection terminal of the measurement transmitter MU2, consequently it can be provided that the two-conductor line 2L2, as well as also directly evident from each of FIGS. 4 and 5, extends not to the evaluating- and supply electronics ES, but only connects the measurement transmitter MU1 and the measurement transmitter MU2 electrically with one another. In an additional embodiment of the measuring-device system of the invention, the measuring device FD1 is embodied as a two-conductor-field device, namely in such a manner that, as well as also shown in each of FIGS. 4 and 5, its measurement transmitter MU1 is supplied with electrical energy during operation of the measuring device FD1 only by wire via the electrical current loop 2L and also only via the electrical current loop 2L are measured values transmitted by wire to the evaluating- and supply electronics ES.

In the case of the measuring-device system of the invention, such as shown in FIGS. 4, 5 and 7, in each case, or such as directly evident from their combination, at least the measurement transmitter MU2 includes, furthermore, also a radio unit RF2. Additionally, the measurement transmitter MU2 is also adapted to receive the transducer signal s2 and to convert such into a radio signal m2, namely electromagnetic, free-space waves transmitted via radio unit RF2 and wirelessly transmitting a sequence of measured values M2 quantifying the measured variable x2. Radio unit RF2 in an additional embodiment of the measuring-device system of the invention is, furthermore, adapted to transmit at least the radio signal m2 with a first radiative power, for example, also an adaptable radiative power and/or a radiative power amounting to less than 100 mW (milliwatt), and/or to process, especially to transmit and/or to receive, radio signals conforming to at least one of the standards IEEE 802.15.4, for example, WPAN, wireless HART or ZigBee, IEEE 802.11, for example, WLAN or WiFi, and IEEE 802.15.1, for example, Bluetooth. In an additional embodiment, the interface circuit IF2 is, additionally, adapted to control the radio unit IF2 as a function of an instantaneous electrical current level of the above described loop current I1, for example, in such a manner that a radiative power, with which the radio signal is transmitted in the case of a lower electrical current level, is less than in the case of an electrical current level higher in comparison thereto, and vice versa. Alternatively or supplementally, the measurement transmitter MU2 can, furthermore, also be adapted to monitor an input voltage and/or an input electrical current of its interface circuit IF2. Especially, the measurement transmitter MU2 can also be adapted in this connection to transmit via radio unit RF2 an alarm-radio signal, namely electromagnetic, free-space waves wirelessly transmitting messages announcing one or more defects of the measuring-device system, in case the input voltage has subceeded a predetermined minimum value and/or in case the input voltage has exceeded a predetermined maximum value and/or in case the input electrical current has subceeded a predetermined minimum value and/or in case the input electrical current has exceeded a predetermined maximum value. Accordingly, the measuring device FD2 is not only, such as already indicated, adapted at times to operate in a first operating mode, in which namely the measuring transducer MT2 provides the transducer signal s2 and in which the measurement transmitter MU2 receives the transducer signal s2 and at least converts such into the radio signal m2, but, also, the measuring device FD2 is, additionally, also adapted at times not to operate in the above described, first operating mode and during that at least at times to operate instead in a second operating mode, in which the measuring transducer MT2 does not provide the transducer signal s2 and/or in which the measurement transmitter MU2 does not convert the transducer signal s2 into the radio signal m2. Advantageously, the measurement transmitter MU2, and the measuring device FD2 formed therewith, can, furthermore, be adapted, as a function of the measured variable x2 and/or at least one operating parameter ascertained by the measurement transmitter MU2, for example, also based on the transducer signal s2 and/or based on an input electrical current of the interface circuit IF2, thus an operating parameter, which shows the electrical power P2 withdrawable (instantaneously, or foreseeably soon) via an interface circuit IF2, automatically to deactivate the first operating mode and/or to activate the second operating mode; this, for example, also for the case, in which it is detected by means of the measurement transmitter MU2 that the above-mentioned electrical power P2 could not cover a need of the measuring device FD2 operating in the first operating mode for electrical power and/or that an electrical current level of the loop current I1 has not achieved a predetermined minimum value. Alternatively or supplementally, the measurement transmitter MU2, consequently the measuring device FD2 formed therewith, can, additionally, also be adapted as a function of the at least one operating parameter automatically to deactivate the second operating mode and/or to activate the first operating mode, for example, in case it is detected by means of the measurement transmitter MU2 that the electrical power P2 instantaneously supplied via an interface circuit IF2 from the electrical current loop 2L could cover the need of the measuring device FD2 operating in the first operating mode for electrical power and/or that an electrical current level of the input electrical current of the interface circuit IF2 has reached or exceeded the predetermined minimum value. A measured value serving as operating parameter can be, for example, an electrical current level of the above described input electrical current of the interface circuit IF2 or a parameter value derived therefrom, such as e.g. a squared electrical current level proportional to the electrical power P2 (i.e. $I1^2 \sim P2$).

In an additional embodiment of the measuring-device system of the invention, the measuring device FD2 is, furthermore, adapted to operate, for example, also only, in the first operating mode when the measuring device FD1 is operating in its first operating mode, e.g. when the electrical power P1 supplied from the evaluating- and supply electronics ES into the electrical current loop amounts to more than 100 mW, for example, more than 200 mW (P1≥ 20 mA· 12 V), and/or to operate in the second operating mode while the measuring device FD1 is operating in its second operating mode, e.g. when the supplied electrical power P1 from the evaluating- and supply electronics ES into the electrical current loop, consequently the electrical power P2 instantaneously supplied via an interface circuit IF2 from the electrical current loop 2L, amounts to less than 100 mW, for example, less than 50 mW (P1≤4 mA·12 V). In an additional embodiment of the measuring-device system of the invention, the measurement transmitter MU2 is, additionally, adapted in the second operating mode of the measuring device FD2 to register the output signal m1 of the interface circuit IF1 of the measurement transmitter MU1 and convert such into a substitute-radio signal, namely a radio unit transmitted sequence of electromagnetic, free-space waves wirelessly transmitting measured values quantifying the measured variable x1; this, especially, in such a manner that the substitute-radio signal is transmitted with a second radiative power, in given cases, also an adaptable, second radiative power and/or a second radiative power amounting to less than 100 mW and/or lessened compared with the previously mentioned, first radiative power of the radio signal m2.

In an additional embodiment of the measuring-device system of the invention, the evaluating- and supply electronics ES is, additionally, adapted to process, especially to receive and to evaluate, the measurement signal m1 of the measuring device FD1. For example, the evaluating- and supply electronics ES can accordingly also be adapted to digitize the measurement signal m1 and/or using the measurement signal m1 to ascertain measured values M1*, in given cases, also digital measured values M1*, representing the measured variable x1. Moreover, the evaluating- and supply electronics can, additionally, be adapted also to process, especially to receive and to evaluate, the radio signal m2 of the measuring device FD2, for example, with application of the radio signal m2 to ascertain, e.g. to win, from the radio signal m2, measured values M2*, in given cases, also digital measured values M2*, corresponding to the above described measured values M2, and representing the measured variable x2.

The invention claimed is:

1. A measuring-device system, comprising:
a first measuring device embodied as a two-conductor field device,
having a first measured variable transducer which is adapted to react to a first measured variable and to provide a first transducer signal, including an electrical, first transducer signal such that the first transducer signal follows a change of the first measured variable with a change of at least one signal parameter, and
having, electrically connected with the first measured variable transducer, and formed by means of at least one microprocessor, a first measurement transmitter which has an interface circuit serving both for wired energy supply as well as also for wired signal transmission and which is adapted to receive the first transducer signal and to convert such into an electrical output signal of the interface circuit representing the first measured variable and embodied as a binary coded, switching signal;
a second measuring device,
having a second measured variable transducer which is adapted to react to a second measured variable and to provide a second transducer signal, including an electrical, second transducer signal such that the second transducer signal follows a change of the second measured variable with a change of at least one signal parameter, and
having, electrically connected with the second measured variable transducer, and formed by means of at least one microprocessor, a second measurement transmitter which has an interface circuit for wired energy supply and a radio unit and which is adapted to receive the second transducer signal and to convert such into a radio signal transmitted via the radio unit and wirelessly transmitting a sequence of measured values quantifying the second measured variable; and
an evaluating and supply electronics,
wherein the interface circuit of the first measurement transmitter is electrically connected to the evaluating and supply electronics to form an electrical current loop involving both the interface circuit of the first measurement transmitter and the evaluating and supply electronics,
wherein the interface circuit of the second measurement transmitter is electrically connected to the first measurement transmitter and/or the electrical current loop formed therewith, wherein the evaluating and supply electronics is adapted to supply electrical power into the electrical current loop, wherein the first measurement transmitter is adapted both to draw electrical power from the electrical current loop as well as also to transmit a measurement signal to the evaluating and supply electronics by modulation of an electrical current in the electrical current loop driven by the evaluating and supply electronics, wherein the first measure device is adapted to operate at times in a first operating mode in which the first measurement transmitter delivers the measurement signal with a signal level which is greater than a predetermined minimum value, wherein the first measuring device is adapted at times to operate not in its first operating mode and during that to operate at least at times in a second operating mode of the first measurement device in which the first measurement transmitter delivers the measurement signal with a signal level which is less than said predetermined value, wherein the second measurement transmitter is adapted to draw electrical power from the electrical current loop and to control the second measuring transducer and/or the radio unit as a function of an instantaneous electrical current level of an electrical current in the electrical current loop, wherein the second measuring device is adapted at times to operate in a first operating mode of the second measuring device in which the second measuring transducer provides the second transducer signal and in which the second measurement transmitter receives the second transducer signal and converts such at least in to the radio signal, wherein the second measuring device is adapted at times not to operate in its first operating mode and during that to operate at least at times in a second operating mode of the second measuring device in which the second measuring transducer does not provide the second transducer signal and/or in which the second measurement transducer does not convert the second transducer signal into the radio signal, wherein the second measuring device is adapted to operate in its first operating mode if the first measuring device operates in its first operating mode, and wherein the second measuring device is adapted to operate in its second operating mode if the first measuring device operates in its second operating mode.

2. The measuring-device system as claimed in claim 1, wherein the evaluating and supply electronics is adapted to process the measurement signal of the first measuring device.

3. The measuring-device system as claimed in claim 2,
wherein the evaluating and supply electronics is adapted to digitize the measurement signal of the first measuring device; and/or wherein the evaluating and supply electronics is adapted to ascertain measured values representing the first measured variable using the measurement signal of the first measuring device.

4. The measuring-device system as claimed in claim 1,
wherein the electrical current loop has at least one, first two-conductor line formed of two individual conductors, and wherein both a first individual conductor of the first two-conductor line as well as also a second individual conductor of the first two-conductor line are electrically connected to the evaluating and supply electronics such that the first individual conductor of the first two-conductor line forms an outgoing line of the electrical current loop and/or that the second individual conductor of the first two-conductor line forms a return line of the electrical current loop.

5. The measuring-device system as claimed in claim 4, wherein at least the first individual conductor of the first two-conductor line is electrically connected to the second measurement transmitter, to a first connection terminal of the second measurement transmitter electrically connected with the interface circuit of the second measurement transmitter.

6. The measuring-device system as claimed in claim 4, wherein the electrical current loop has a second two-conductor line formed of two individual conductors.

7. The measuring-device system as claimed in claim 6, wherein both a first individual conductor of the second two-conductor line as well as also a second individual conductor of the second two-conductor line are electrically connected to the first measurement transmitter such that the first individual conductor of the second two-conductor line is electrically connected to a first connection terminal of the first measurement transmitter electrically connected with the interface circuit of the first measurement transmitter and the second individual conductor of the second two-conductor line is electrically connected to a second connection terminal of the first measurement transmitter electrically connected with the interface circuit of the first measurement transmitter.

8. The measuring-device system as claimed in claim 7,
wherein the first individual conductor of the second two-conductor line is also electrically connected to a third connection terminal of the second measurement transmitter electrically connected with the interface circuit of the second measurement transmitter, and wherein the second individual conductor of the second two-conductor line is also electrically connected to the second connection terminal of the second measurement transmitter.

9. The measuring-device system as claimed in claim 1,
wherein the interface circuit of the first measurement transmitter is adapted to process, and to transmit and/or to receive, electrical current signals modulated in conformance with standard IEC 61784 1 CPF1; and/or wherein the interface circuit of the first measurement transmitter is adapted to process, and to transmit and/or to receive, electrical current signals modulated in conformance with standard IEC 61784 1 CPF3; and/or wherein the interface circuit of the first measurement transmitter is adapted to process, and to transmit and/or to receive, electrical current signals modulated in conformance with standard IEC 61158; and/or wherein the interface circuit of the first measurement transmitter is adapted to process, and to transmit and/or to receive, electrical current signals modulated by means of frequency shift keying, including electrical current signals modulated in conformance with standard IEC 61784-1 CPF9 and/or IEC 61158; and/or wherein the interface circuit of the second measurement transmitter is adapted to process, and to transmit and/or to receive, electrical current signals modulated by means of frequency shift keying, including electrical current signals modulated in conformance with standard IEC 61784-1 CPF9 and/or IEC 61158; and/or wherein the radio unit of the second measurement transmitter is adapted to process, and to transmit and/or to receive, radio signals conforming to at least one of the following standards:
IEEE 802.15.4,
IEEE 802.11,
IEEE 802.15.1.

10. The measuring-device system as claimed in claim 1, wherein the first measurement transmitter is adapted to transmit the output signal to the evaluating and supply electronics by modulation of an electrical current in the electrical current loop driven by the evaluating and supply electronics such that the loop current is set as a function of the first measured variable by means of the interface circuit of the first measurement transmitter to an electrical current level lying within a range 4-20 mA.

11. The measuring-device system as claimed in claim 1, wherein the interface circuit of the first measurement transmitter is adapted to output the output signal serving as measurement signal as a signal standardized to conform to DIN IEC 60381 1:1985 11.

12. The measuring-device system as claimed in claim 11, wherein the interface circuit of the first measurement transmitter is adapted to output its output signal serving as measurement signal as an electrical current signal conforming to DIN IEC 60381 1:1985 11 such that the measurement signal for the measured variable is a switching signal with binary coding of only two discrete values, namely nominally an electrical current level of the electrical current of the output signal of 4 mA or 20 mA.

13. The measuring-device system as claimed in claim 1, wherein the electrical current loop involves at least also the interface circuit of the second measurement transmitter such that the interface circuit of the first measurement transmitter and the interface circuit of the second measurement transmitter are electrically connected in series such that an electrical current in the electrical current loop driven by the evaluating and supply electronics corresponds both to an electrical current of the output signal of the interface circuit of the first measurement transmitter as well as also to an input electrical current of the interface circuit of the second measurement transmitter.

14. The measuring-device system as claimed in claim 13, wherein the interface circuit of the second measurement transmitter is adapted to carry, simultaneously with the interface circuit of the first measurement transmitter, the electrical current of its output signal and/or an electrical current in the electrical current loop driven by the evaluating and supply electronics.

15. The measuring-device system as claimed in claim 13, wherein the second measurement transmitter includes a storage circuit electrically connected with its interface circuit, wherein the storage circuit includes one or more rechargeable electrochemical storers and/or one or more super capacitors, wherein the storage circuit is adapted to store electrical energy drawn from the interface circuit of the second measurement transmitter and to supply electrical energy required for generating the second transducer signal and/or the radio signal, including in case an electrical power instantaneously supplied via an interface circuit of the second measurement transmitter from the electrical current loop does not cover an instantaneous need of the second measuring device for electrical power and/or in case an electrical current level of an input electrical current of the interface circuit of the second measurement transmitter does not reach a predetermined minimum value.

16. The measuring-device system as claimed in claim 13, wherein the second measurement transmitter is adapted to ascertain a value, including an instantaneous value and/or an effective value, of an electrical power instantaneously supplied via an interface circuit of the second measurement transmitter from the electrical current loop and/or an electrical current level of an input electrical current of the interface circuit of the second measurement transmitter.

17. The measuring-device system as claimed in claim 1, wherein the radio unit of the second measurement transmitter is adapted to transmit the radio signal with a first radiative power, including an adaptable first radiative power and/or a first radiative power amounting to less than 100 mW (milliwatt).

18. The measuring-device system as claimed in claim 1, wherein in the first operating mode of the first measurement transmitter the signal level of the measurement signal represents the first measured variable, wherein the signal level is in the form of an electrical current level of an electrical current in the electrical current loop, and wherein the electrical current level is greater than the predetermined minimum value such that the electrical power supplied by the evaluating and supply electronics in the electrical current loop amounts to greater than 100 mW and/or that the electrical current level amounts to 20 mA.

19. The measuring-device system as claimed in claim 1, wherein in the second operating mode of the first measurement device the first measurement transmitter delivers the measurement signal with a signal level representing the first measured variable, wherein the signal level is in the form of an electrical current level of an electrical current in the electrical current loop which is less than the redetermined minimum value such that the electrical power supplied by the evaluating and supply electronics in the electrical current loop amounts to less than 100 mW and/or that an electrical current level of an electrical current in the electrical current loop amounts to 4 mA.

20. The measuring-device system as claimed in claim 1, wherein the second measurement transmitter is adapted in the second operating mode of the second measuring device to convert the output signal of the interface circuit of the first measurement transmitter into a substitute radio signal transmitted via the radio unit and wirelessly transmitting a sequence of measured values quantifying the first measured variable.

21. The measuring-device system as claimed in claim 20, wherein the radio unit of the second measurement transmitter is adapted to transmit the substitute radio signal with a second radiative power, an adaptable, second radiative power and/or a second radiative power amounting to less than 100 mW and/or lessened compared with a first radiative power of the radio signal.

22. The measuring-device system as claimed in claim 21, wherein the second measuring device is adapted, as a function of the second measured variable and/or as a function of at least one operating parameter ascertained by the second measurement transmitter from the second transducer signal and/or based on an input electrical current of the interface circuit of the second measurement transmitter, and representing an electrical power withdrawable via interface circuit, an operating parameter in the form of an electrical current level of an input electrical current of the interface circuit of the second measurement transmitter, automatically to deactivate the first operating mode and/or to activate the second operating mode in case the second measurement transmitter detects that an electrical power instantaneously supplied via an interface circuit of the second measurement transmitter from the electrical current loop does not cover a need of the second measuring device operating in the first operating mode for electrical power and/or that an electrical current level of an electrical current in the electrical current loop does not reach a predetermined minimum value; and/or wherein the second measuring device is adapted, as a function of the at least one operating parameter, automatically to deactivate the second operating mode and/or to activate the first operating mode in case the second measurement transmitter detects that an electrical power instantaneously supplied via an interface circuit of the second measurement transmitter from the electrical current loop can cover the electrical power required by the second measuring device operating in the first operating mode and/or that an electrical current level of an input electrical current of the interface circuit of the second measurement transmitter has achieved or exceeded a predetermined minimum value.

23. The measuring-device system as claimed in claim 1, wherein the evaluating and supply electronics is adapted to process, including to receive and to evaluate, the radio signal of the second measuring device, and with application of the radio signal, to ascertain from the radio signal measured values representing the second measured variable.

24. The measuring-device system as claimed in claim 1, wherein the second measurement transmitter is adapted to monitor an input voltage and/or an input electrical current of the interface circuit of the second measurement transmitter, and via the radio unit to transmit an alarm radio signal, namely electromagnetic, free-space waves wirelessly transmitting news announcing a defect of the measuring-device system, in case the input voltage has subceeded a predetermined minimum value and/or in case the input voltage has exceeded a predetermined maximum value and/or in case the input electrical current has subceeded a predetermined minimum value and/or in case the input electrical current has exceeded a predetermined maximum value.

25. The measuring-device system as claimed in claim 1,
wherein the first measuring device has a first transmitter housing within which the first measurement transmitter is accommodated, at least in part, a pressure resistant and/or explosion resistant, first transmitter housing and/or one protecting against penetration of dust in damaging amounts and/or against penetration of water spray from all sides and/or at least meeting requirements of protection type IP 54 according to DIN EN 60529:2014 09 and/or requirements of ignition protection type, "pressure resistant encapsulation (Ex d)", according to EN 60079 1:2007 and/or solidly connected with the first measurement transmitter; and/or wherein the second measuring device has a second transmitter housing, within which the second measurement transmitter is accommodated, at least in part, a pressure resistant and/or explosion resistant, second transmitter housing, and/or one protecting against penetration of dust in damaging amounts and/or against penetration of water spray from all sides and/or at least meeting the requirements of protection type IP 54 according to DIN EN 60529:2014 09 and/or the requirements of ignition protection type, "pressure resistant encapsulation (Ex d)", according to EN 60079 1:2007 and/or located remotely from the first transmitter housing by more than 1 m (meter) and/or solidly connected with the second measuring transducer; and/or wherein the first measurement transmitter meets ignition protection type, "device protection by intrinsic safety (Exi)", according to EN 60079 11:2012 and/or ignition protection type, "increased safety (Ex e)", according to EN 60079 7:2007; and/or wherein the second measurement transmitter meets ignition protection type, "device protection by intrinsic safety (Exi)", according to EN 60079 11:2012 and/or ignition protection type, "increased safety (Ex e)", according to EN 60079 7:2007.

26. The measuring-device system as claimed in claim 1, wherein the first measuring device is embodied as a fill level limit switch.

27. The measuring-device system as claimed in claim 1, wherein the first measuring device is embodied as a flow switch.

28. The measuring-device system as claimed in claim 1, wherein the first measuring device is embodied as a pressure switch.

29. The measuring-device system as claimed in claim 1, wherein the second measuring device is embodied as a fill level measuring device.

30. The measuring-device system as claimed in claim 1, wherein the second measuring device is embodied as a flow measuring device.

31. A measuring assembly, comprising:
a measuring-device system, including:
a first measuring device embodied as a two-conductor field device,
having a first measured variable transducer which is adapted to react to a first measured variable and to provide a first transducer signal, including an electrical, first transducer signal such that the first transducer signal follows a change of the first measured variable with a change of at least one signal parameter, and
having, electrically connected with the first measured variable transducer, and formed by means of at least one microprocessor, a first measurement transmitter which has an interface circuit serving both for wired energy supply as well as also for wired signal transmission and which is adapted to receive the first transducer signal and to convert such into an electrical output signal of the interface circuit representing the first measured variable and embodied as a binary coded, switching signal;
a second measuring device,
having a second measured variable transducer which is adapted to react to a second measured variable and to provide a second transducer signal, including an electrical, second transducer signal such that the second transducer signal follows a change of the second measured variable with a change of at least one signal parameter, and
having, electrically connected with the second measured variable transducer, and formed by means of at least one microprocessor, a second measurement transmitter which has an interface circuit for wired energy supply and a radio unit and which is adapted to receive the second transducer signal and to convert such into a radio signal transmitted via the radio unit and wirelessly transmitting a sequence of measured values quantifying the second measured variable; and
an evaluating and supply electronics,
wherein the interface circuit of the first measurement transmitter is electrically connected to the evaluating and supply electronics to form an electrical current loop involving both the interface circuit of the first measurement transmitter and the evaluating and supply electronics, wherein the interface circuit of the second measurement transmitter is electrically connected to the first measurement transmitter and/or the electrical current loop formed therewith, wherein the evaluating and supply electronics is adapted to supply electrical power into the electrical current loop, wherein the first measurement transmitter is adapted both to draw electrical power from the electrical current loop as well as also to transmit a measurement signal to the evaluating and supply electronics by modulation of an electrical current in the electrical current loop driven by the evaluating and supply electronics, wherein the first measure device is adapted to operate at times in a first operating mode in which the first measurement transmitter delivers the measurement signal with a signal level which is greater than a predetermined minimum value, wherein the first measuring device is adapted at times to operate not in its first operating mode and during that to operate at least at times in a second operating mode of the first measurement device in which the first measurement transmitter delivers the measurement signal with a signal level which is less than said predetermined value, wherein the second measurement transmitter is adapted to draw electrical power from the electrical current loop and to control the second measuring transducer and/or the radio unit as a function of an instantaneous electrical current level of an electrical current in the electrical current loop, wherein the second measuring device is adapted at times to operate in a first operating mode of the second measuring device in which the second measuring transducer provides the second transducer signal and in which the second measurement transmitter receives the second transducer signal and converts such at least in to the radio signal, wherein the second measuring device is adapted at times not to operate in its first operating mode and during that to operate at least at times in a second operating mode of the second measuring device in which the second measuring transducer does not provide the second transducer signal and/or in which the second measurement transducer does not convert the second transducer signal into the radio signal, wherein the second measuring device is adapted to operate in its first operating mode if the first measuring device operates in its first operating mode, and wherein the second measuring device is adapted to operate in its second operating mode if the first measuring device operates in its second operating mode; and a flow system formed by means of a tank and/or a pipeline, and adapted to convey a flowable medium, wherein both the first measuring transducer and the second measuring transducer are applied in the flow system and are spaced from one another by more than 1 m (meter).

32. The measuring assembly as claimed in claim 31, wherein the first measuring transducer is located more than 1 m from the second measuring transducer; and/or wherein the first measurement transmitter is located more than 1 m from the second measurement transmitter; and/or wherein the first measurement transmitter is located more than 1 m from the evaluating and supply electronics (ES); and/or wherein the second measurement transmitter is located more than 1 m from the evaluating and supply electronics (ES); and/or wherein the first measurement transmitter is located less than 1 m from the first measuring transducer; and/or wherein the second measurement transmitter is located less than 1 m from the second measuring transducer.

* * * * *